United States Patent [19]
Jarahian

[11] Patent Number: 5,272,834
[45] Date of Patent: Dec. 28, 1993

[54] METHOD AND APPARATUS FOR PLANT CULTURE

[76] Inventor: Roffi J. Jarahian, 1126 S. Quality Ave., Sanger, Calif. 93657

[21] Appl. No.: 617,161

[22] Filed: Nov. 23, 1990

[51] Int. Cl.⁵ ............................................... A01G 17/06
[52] U.S. Cl. ................................. 47/46; 211/119.1; 211/119.01
[58] Field of Search ................... 47/47, 44, 45; 211/119.01, 119.1

[56] References Cited

U.S. PATENT DOCUMENTS

| | | | |
|---|---|---|---|
| 587,365 | 8/1897 | Forde | 47/46 |
| 787,839 | 4/1905 | Ernst | 174/45 |
| 950,320 | 2/1910 | Fonda | 211/119.01 |
| 1,134,850 | 4/1915 | Hébert | 211/119.1 |
| 2,360,458 | 10/1944 | Wentz | 211/119.1 |
| 2,508,491 | 5/1950 | Cayo | 211/119.01 |
| 2,530,015 | 11/1950 | Kouri | 47/46 |
| 2,557,731 | 6/1951 | Felsing . | |
| 3,391,491 | 7/1968 | Daly . | |
| 3,878,590 | 4/1975 | Bolger . | |
| 4,023,307 | 5/1977 | Clark et al. . | |
| 4,381,838 | 5/1983 | Boogaart | 47/39 |
| 4,503,636 | 3/1985 | Stuckey . | |
| 4,536,989 | 8/1985 | Caywood et al. . | |
| 4,620,389 | 11/1986 | Coulson . | |
| 4,642,940 | 2/1987 | Ettema et al. . | |
| 4,703,584 | 11/1987 | Chazalnoel . | |

OTHER PUBLICATIONS

Ebro–Espalier Growing System 6 pages.

Primary Examiner—Henry E. Raduazo
Attorney, Agent, or Firm—Worrel & Worrel

[57] ABSTRACT

A method for plant culture including the steps of growing a plant adjacent to a frame having at least one linear member, disposing a support on the linear member, resting a portion of the plant on the support in supported relation and moving the support along the linear member to accommodate the growth of the portion of the plant. An apparatus for plant culture including a support structure having a substantially linear member and a support borne by said linear member disposed for supporting a portion of a plant growth adjacent thereto and adapted for selective, substantially slidable movement on the linear member to accommodate growth in the portion of the plant.

2 Claims, 2 Drawing Sheets

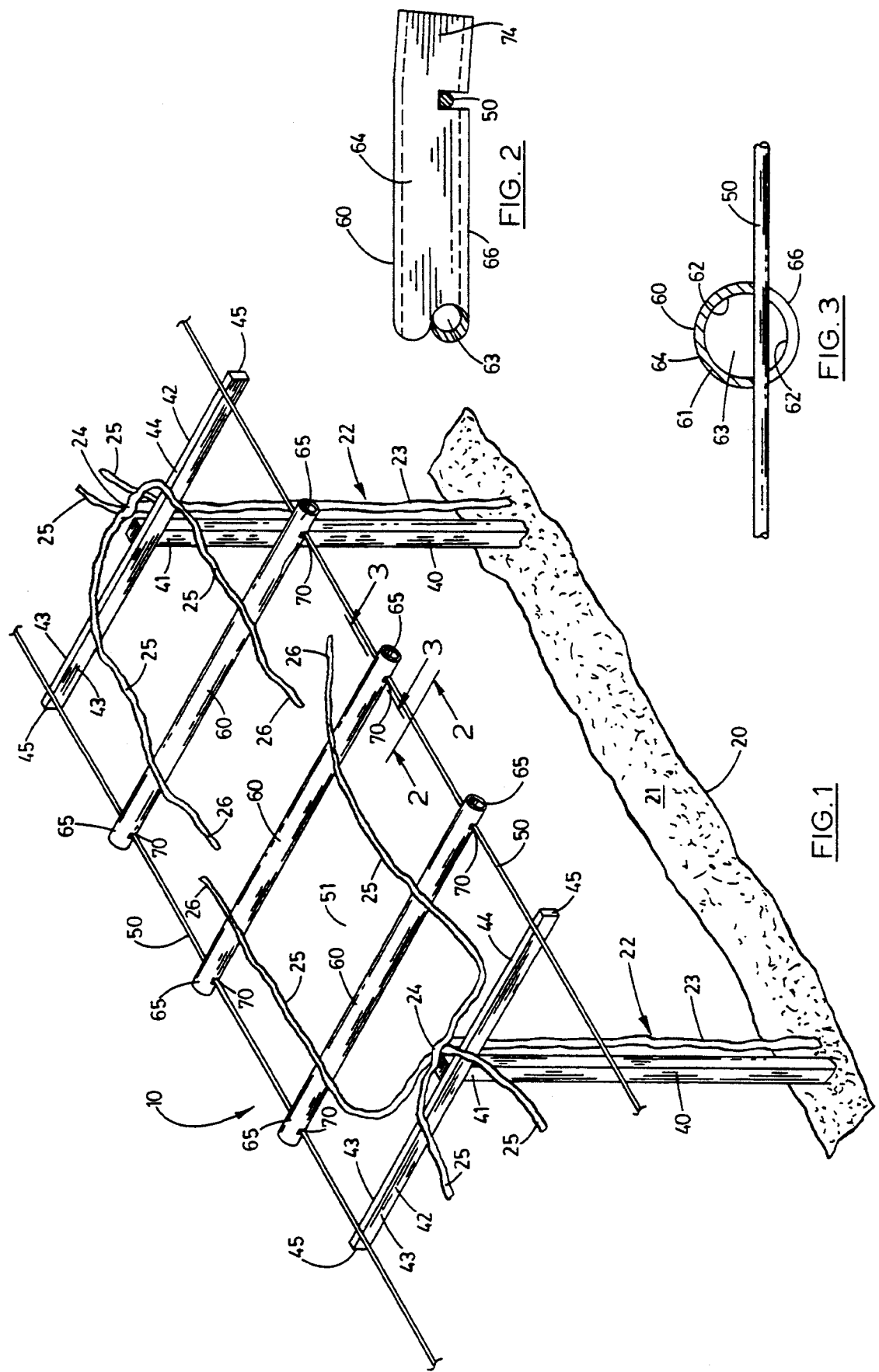

METHOD AND APPARATUS FOR PLANT CULTURE

BACKGROUND OF THE INVENTION

1. Field of the Invention

The present invention relates to a method and apparatus for plant culture and, more particularly, to a method and apparatus which permit the crop producing portions of plants, and particularly upstanding commercial crop varieties such as grapevines having tendrils, to be supported with the crop producing portions thereof supported throughout the growing season in such a manner as to be easily adjustable to accommodate such growth as it takes place with substantially less expenditure of labor than is required by conventional techniques of plant culture not possessing these operative advantages.

2. Description of the Prior Art

The growing of commercial plant varieties, and particularly those that produce commercially harvested crops, entails a multitude of considerations which include both the horticultural requirements of the plants for commercially acceptable crop production as well as those purely commercial considerations such as minimizing the costs associated with such a commercial operation. Because of the costs associated with the planting, training and harvesting of commercial crops, including the need to protect the plants from diseases and pests as well as the need to prevent or eliminate unwanted growth such as weeds and the like, the costs resulting from both manual and mechanical labor are significant. Frequently the difference between a successful commercial operation and one that is not so fortunate resides in the efficiency with which such horticultural practices can be performed.

In the case of commercial crops such as grapes, significant manual labor is required in conventional horticultural practices to train the grapevines on a trellis structure, to secure the tendrils or canes of the grapevines which produce the crop on the trellis structure, to secure new growth of the canes on the trellis structure through the growing season, to harvest the crop from the canes and then to prune the canes for the next growing season. Conventional practice requires that the canes of the grapevines be tied on the trellis wires in the desired arrangement so that the crop once produced is more readily accessible and so that the crop produced is supported in such a fashion as to be most productive. While a wide variety of conventional practices exist, both as to configuration of the trellis structure as well as to the manner in which the canes are secured on the trellis structure, conventional practice in all cases of which the applicant is aware require that the canes be tied on the trellis structure and that this be done at two or more times during the growing season so that the new growth of the canes is adequately secured on the trellis structure for harvest. The manual labor required for tying of the canes constitutes a significant expense in the over all commercial operation.

Subsequent to the harvest season, the canes must be pruned extensively and the prunings removed from the trellis structure for disposal. While the pruning operation itself may be relatively easily performed by semi-skilled laborers, much of the canes which have been pruned remain tied on the trellis structure, and so must be untied therefrom for removal and disposal. The cost of manual labor to perform this operation constitutes a significant percentage of the over all cost of the pruning operation. These and other problems associated with conventional horticultural practices have long been the focus of attention heretofore without satisfactory resolution.

Therefore, it has long been known that it would be desirable to have a method and apparatus for plant culture which is particularly well suited to the growth of commercial crops, such as grapes, which permits the fruiting portions of the plants to be trained in a manner most conducive to optimum crop production, which notwithstanding the horticultural benefits associated therewith reduces to an absolute minimum the expense associated with its practice in both manual and mechanical labor and which is otherwise more efficient and productive than conventional horticultural practices.

SUMMARY OF THE INVENTION

Therefore, it is an object of the present invention to provide an improved method and apparatus for plant culture.

Another object is to provide such a method and apparatus which are particularly well suited to the raising of commercial crop varieties such as grapes which are produced by the tendrils or canes thereof which must be trained on a trellis structure prior to the growth of the crops in order to be commercially productive and efficiently harvested.

Another object is to provide such a method and apparatus which permit the fruiting portions of commercial crop varieties to be trained in a productive manner without the need to secure such fruiting portions such as by tying them to a trellis structure during the growing season.

Another object is to provide such a method and apparatus which do not require semi-skilled manual labor to secure the fruiting portions thereof at several times during the growing season and prior to harvest.

Another object is to provide such a method and apparatus which permit the supporting structure to be adjusted as may be most desirable during the growing season to accommodate the continued growth of the fruiting portions thereof.

Another object is to provide such a method and apparatus which allow grapevines to be trained to support the crop in the manner of an arbor without the need to tie any such portions in place while supporting the crop in a fruiting zone from which it can most efficiently be harvested.

Another object is to provide such a method and apparatus which permit the canes of grapevines subsequent to the harvest season to be pruned and removed for disposal without the need to untie the portions pruned from the trellis structure.

Another object is to provide such a method and apparatus which employ an inexpensive operative component which is lightweight, adjustable and extremely durable permitting use throughout a long operational life.

Another object of the present invention is to provide such a method and apparatus which employ operative portions which can be assembled by substantially unskilled laborers.

Further objects and advantages are to provide improved elements and arrangements thereof in an apparatus for the purpose described which is dependable, economical, durable and fully effective in accomplishing its intended purpose.

These and other objects and advantages are achieved, in the preferred embodiment of the method and apparatus of the present invention, wherein the method includes the steps of growing a plant adjacent to a frame having a pair of spaced, substantially parallel tensioned wires defining a substantially horizontal plane, supporting a plurality of substantially rigid members in substantially slidable relation on and interconnecting the wires, and draping the tendrils as they grow over the substantially rigid members to support the crops in depending relation from the substantially horizontal plane.

BRIEF DESCRIPTION OF THE DRAWINGS

FIG. 1 is a fragmentary perspective view showing the apparatus for plant culture of the present invention operable in the practice of the method of the present invention in a typical operative environment supporting the canes of grapevines during the growing season.

FIG. 2 is a somewhat enlarged, fragmentary, transverse vertical section taken on line 2—2 in FIG. 1.

FIG. 3 is a somewhat enlarged, fragmentary, longitudinal vertical section taken on line 3—3 in FIG. 1.

DESCRIPTION OF THE PREFERRED EMBODIMENT

Figure 4:
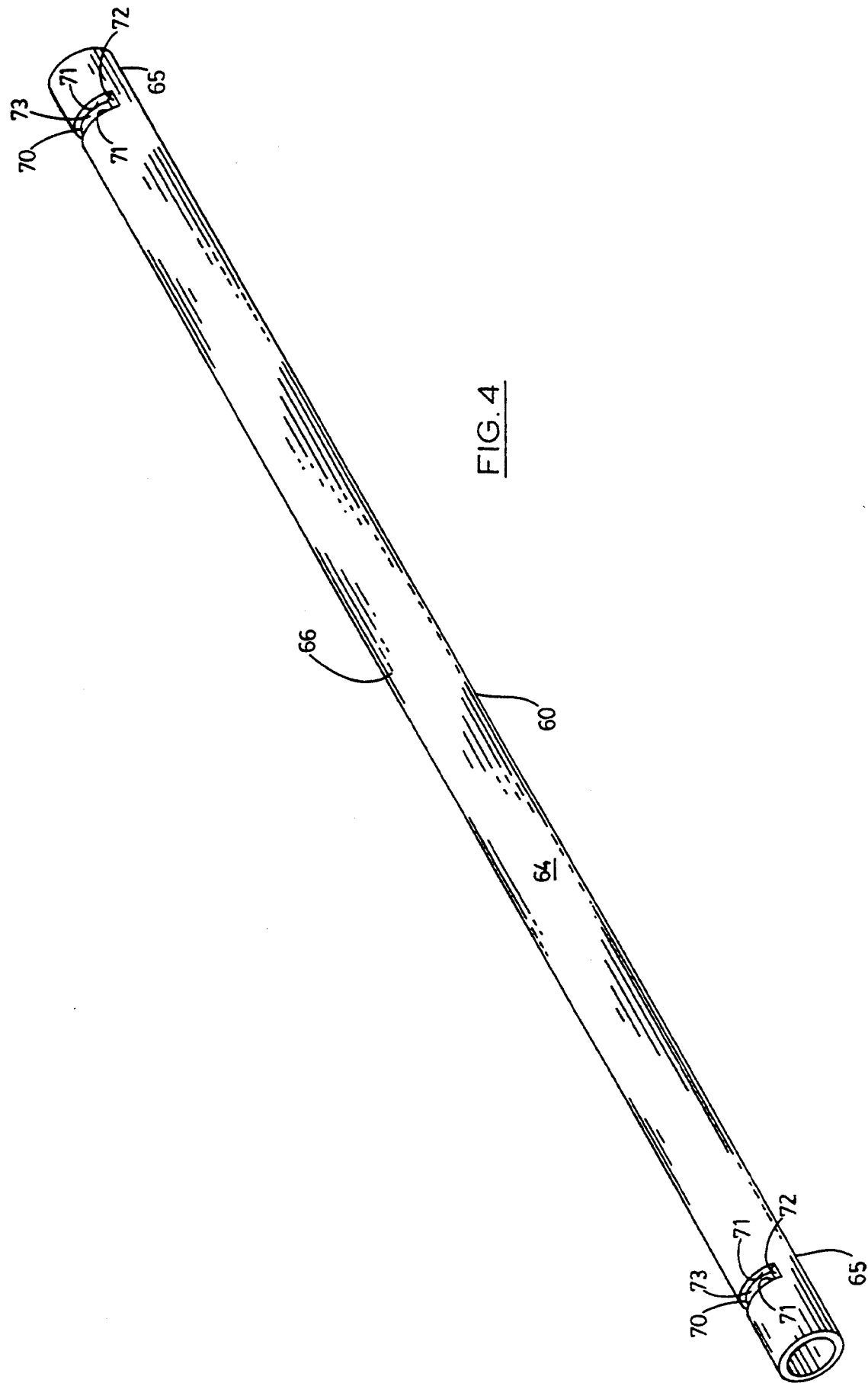
FIG. 4 is a bottom perspective view of one of the supports of the apparatus for plant culture of the present invention.

Referring more particularly to the drawings, the apparatus for plant culture of the present invention is generally indicated by the numeral 10 in FIG. 1. The apparatus is shown therein mounted in a typical operative environment for the practice of the method of the present invention. As shown in FIG. 1, the earth is indicated at 20 with the earth's surface at 21. Two plants, in this case grapevines 22, are shown therein growing in the earth and extending upwardly in spaced relation to each other. It will be understood that the grapevines 22 constitute two of a plurality of grapevines forming a row of such grapevines in what may be considered to be a typical commercial planting.

Each grapevine 22 has a trunk 23 which has been pruned thus to extend upwardly to a head 24. The heads of the grapevines are disposed at approximately the same elevation in the row. The heads of the grapevines, during the growing season, grow tendrils or canes 25 which extend to terminal ends 26. The canes of the grapevines of the previous growing season are pruned prior to the next growing season from the grapevines. Thus, it will be understood that the canes 25 are those produced during a single growing season. The canes of the grapevines are the portions thereof which produce the crop and from which the crop is harvested.

It is, of course, known to train the canes of grapevines on a host of different types of trellis structures in accordance with conventional plant culturing techniques. However, it will be understood and hereinafter described in greater detail that the canes shown in FIG. 1 are disposed and retained in the attitude shown therein in accordance with the method of the present invention.

The apparatus 10 of the present invention includes a plurality of upright posts 40 mounted in the earth 20 in upstanding relation individually adjacent to the trunks 23 of the grapevines 22. The posts are preferably not attached in any manner to the grapevines. The posts can be constructed of either metal or wood or another suitable material and have an upper portion 41. Each of the posts 40 has a cross member 42 mounted on the upper end portion 41 of the post. The cross member has opposite sides 43, an upper edge 44 and opposite end portions 45. Each cross member is mounted on its respective post so that one of its opposite sides 43 is in facing engagement with the post and the upper edge 44 is substantially coplanar with the upper end of the post and is disposed in a substantially horizontal attitude.

The common opposite end portions 45 of the cross members 42 of the posts 40 of the row of grapevines 22 are interconnected by a single linear member or wire 50. The wires are tensioned so as to extend in a ridged fashion interconnecting the common end portions of the cross members. Similarly, a second linear member or wire 50 is secured on the common opposite end portions 45 of the cross members. The wires are disposed in spaced substantially parallel relation to each other defining a space 51 between the wires. Similarly, the wires define a substantially horizontal plane adjacent of the heads 24 of the grapevines 22. The wires are fastened on their respective opposite end portions by any suitable means such as a cleat or the like.

A plurality of rigid supports or galvanized metal tubes 60 are mounted on and interconnect the wires 50 extending transversely therebetween and disposed substantially in the common horizontal plane defined by the wires. Each of the supports, in the preferred embodiment, is a one-half inch (½") diameter, galvanized metal tube such as the type known as "electrical maintenance tubing" commonly employed as conduit for electrical lines and the like. However, it will be understood that the supports can be of a wide variety of specific constructions. Each support 60 has a cylindrical wall 61 having a cylindrical internal surface 62 bounding an internal passage 63. The cylindrical wall has a cylindrical external surface 64 and opposite end portions 65. Each tube has a lower surface 66 which is shown in FIG. 4 disposed in upwardly facing relation for illustrative convenience.

As perhaps shown best in FIG. 4, a slot 70 is formed in the lower surface 66 of each opposite end portions 65 of the support 60 in predetermined spaced relation to each other corresponding to the distance between the wires 50, or in other words, the space 51. Each slot 70 is defined by lateral edges 71 and inner edges 72. The lateral and inner edges define a passage 73 extending transversely of the support. As can be seen in FIG. 2, when installed in accordance with the preferred embodiment of the method of the present invention, the opposite end portions of each support are bent downwardly to form bent portions 74, as will hereinafter be described in greater detail.

OPERATION

The operation of the described embodiment of the subject invention and the practice of the method of the present invention are believed to be clearly apparent and are briefly summarized at this point. The apparatus 10 is assembled as described so that the wires 50 define a horizontal plane extending over the heads 24 of the grapevines 22 as shown in FIG. 1.

The supports 60 are individually positioned on the wires 50 so as to interconnect them as shown in FIG. 1. This is achieved by fitting the wires 50 individually into the slots 70 so that the lower surface of each tube faces toward the earth's surface 21 and so that the support extends substantially normal to and between the wires.

In accordance with the preferred embodiment of the method and apparatus of the present invention, the opposite end portions 65 are then bent downwardly slightly toward the earth's surface 21 so as to capture each wire 50 in its respective slot 70 and thereby forming the bent portions 74 thereof. This permits the supports to be moved slidably along the wires while retaining them in position on the wires. Alternatively, the bent portion 74 can be bent farther downwardly so that the lateral edges 71 cut into the wire and thereby releasably lock each support in a selected position along the wires.

In accordance with the method of the present invention, several of the supports 60 are so mounted on the wires 50 on each side of each grapevine 22 such as shown in FIG. 1. During the growing season, the canes 25 are laid on the supports 60 extending toward the canes of the adjacent grapevine between the wires 50. The canes are simply rested in position and are preferably not otherwise secured on the support wires or other structure. As the canes grow, the force of gravity retains the canes on the supports. During the growing season, the supports 60 can be adjusted as to position by slidably moving them along the wires to provide the optimum support for the canes. Further, additional supports 60 can be mounted as described in position so as to afford additional support for the canes.

The method and apparatus of the present invention thereby permit the canes to form a canopy supported entirely by gravitational engagement on the supports 60. As the weight of the canes, foliage and crop increases, the canes are more firming retained in the described position without requiring any retention other than gravity to maintain such support. Furthermore, since the canes do not need to be tied on the apparatus 10, the manual labor required in providing such support throughout the growing season for the canes is of minimal significance and is substantially less than that associated with conventional methods.

Since the canes 25 produce the crop, the crop is supported gravitationally beneath the canes in substantially a common zone immediately beneath the horizontal plane defined by the wires 50. Accordingly, harvesting of the crop therefrom is substantially facilitated and is therefore more rapid and substantially less expensive than in the case of conventional methods.

After the harvest season and before the next growing season, the pruning which grapevines conventionally require to prepare them for the next growing season and so as to maximize the productivity thereof is substantially facilitated. Since the canes 25 are not secured on the supports 60, there are no ties to be removed from the apparatus. Accordingly, when a cane is severed, it can simply be pulled from the apparatus for disposal without having to untie any fastening members which conventionally would be retaining it in place. Furthermore, in many instances, once severed, the canes simply gravitationally fall from the supports for such disposal. Since the supports are slidable, in the preferred embodiment, along the wires 50, they are easily repositioned as may be desired to provide optimum support for the young canes during early growth in the next growing season. Still further, since the supports are preferably constructed of galvanized metal tubing which is quite inexpensive, durable and exceedingly strong, the operational life of the apparatus is substantially enhanced over that of conventional methods and apparatuses.

Therefore, the method and apparatus for plant culture of the present invention provide a substantially less expensive and considerably more productive means by which plant life and particularly commercial plant varieties, such as grapevines and the like, can be grown, maintained, harvested and otherwise attended to consistent with the horticultural requirements of the particular variety all in a manner which is not only substantially more convenient than is possible with conventional methods and apparatuses, but is also substantially less expensive than has heretofore been possible.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An apparatus for plant culture comprising a support structure having a pair of tensioned wires disposed in spaced, substantially parallel relation to each other and a plurality of rigid tubular members for supporting portions of a plant grown adjacent thereto, the tubular members having slots therein dimensioned and spaced from each other for individual receipt of said wires therewithin for slidable movement of said tubular members along said wires for selective positioning to accommodate growth in said portions of the plant grown adjacent thereto.

2. The apparatus of claim 1 wherein said tubular members are galvanized metal tubes adapted to be bent adjacent to the slots individually to capture said wires within the slots for said slidable movement along the wires.

* * * * *

UNITED STATES PATENT AND TRADEMARK OFFICE
CERTIFICATE OF CORRECTION

PATENT NO. : 5,272,834

DATED : DECEMBER 28, 1993

INVENTOR(S) : ROFFI J. JARAHIAN

It is certified that error appears in the above-identified patent and that said Letters Patent is hereby corrected as shown below:

TITLE PAGE

Abstract, Line 10 between "plant" and "adjacent", delete ---growth--- and substitute ---grown---.

Column 4, Line 20, delete ---of--- and substitute ---to---.

Signed and Sealed this

Tenth Day of May, 1994

Attest:

BRUCE LEHMAN

Attesting Officer

Commissioner of Patents and Trademarks